(12) United States Patent
Blackwell et al.

(10) Patent No.: US 6,374,642 B1
(45) Date of Patent: Apr. 23, 2002

(54) METHOD AND APPARATUS FOR COMBUSTION-ENHANCED VAPORIZATION

(75) Inventors: Jeffrey L. Blackwell; Lisa A. Moore, both of Corning; Huailiang Wei, Horseheads; Daniel W. Hawtof, Painted Post, all of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/526,024

(22) Filed: Mar. 15, 2000

(51) Int. Cl.$^7$ .............................. C03B 20/00; C03B 8/04
(52) U.S. Cl. .............................. 65/414; 65/421; 65/531; 65/17.4
(58) Field of Search ............................ 65/17.2, 17.4, 65/415, 531, 413, 414, 416, 421

(56) References Cited

U.S. PATENT DOCUMENTS

| | | | | |
|---|---|---|---|---|
| 3,741,796 A | * | 6/1973 | Walker | 264/332 |
| 4,135,901 A | * | 1/1979 | Fujiwara et al. | 385/129 |
| 4,165,223 A | | 8/1979 | Powers | |
| 4,336,049 A | | 6/1982 | Takahashi et al. | |
| 4,367,013 A | * | 1/1983 | Guerder et al. | 385/127 |
| 4,726,827 A | * | 2/1988 | Powers | 65/415 |
| 5,110,335 A | * | 5/1992 | Miller et al. | 427/167 |
| 5,599,371 A | * | 2/1997 | Cain et al. | 65/17.4 |
| 5,676,725 A | * | 10/1997 | Ito et al. | 65/382 |
| 5,979,185 A | | 11/1999 | Blackwell et al. | |

FOREIGN PATENT DOCUMENTS

| | | | |
|---|---|---|---|
| JP | 6-122528 | * | 5/1994 |
| JP | 6-122529 | * | 5/1994 |

OTHER PUBLICATIONS

Machine assisted Translation of Japan 6–122528, Derwent, Thomson Scientific.*

* cited by examiner

Primary Examiner—Sean Vincent
(74) Attorney, Agent, or Firm—Mary Y. Redman

(57) ABSTRACT

An apparatus for producing a glass soot includes a first a burner having a droplet-emitting first region, a gas-emitting second region surrounding the first region, and a gas-emitting third region surrounding the second region. The first region emits a glass-forming mixture, the second region emits an inert gas, and the third region emits a combination of oxygen and a combustible gas. The apparatus further includes a combustion area having a first section proximate the first burner and a second section distal from the first burner. A glass-forming mixture is at least partially vaporized in the first section of the combustion area. The apparatus further includes at least one secondary burner having gas-emitting fourth and fifth regions. The fourth region of the secondary burner emits oxygen and the fifth region of the secondary burner emits a combustible gas. The second section of the conversion area is in communication with the fourth and fifth regions of the secondary burner, such that the glass-forming mixture is completely vaporized and converted into a glass soot deposited on a preform such as a bait rod. The invention also includes a method of enhanced vaporization using first and second spaced apart combustion areas.

30 Claims, 4 Drawing Sheets

METHOD AND APPARATUS FOR COMBUSTION-ENHANCED VAPORIZATION

BACKGROUND OF THE INVENTION

1. Field of the Invention

The present invention relates to burners for use in producing preforms that can be used to produce optical waveguide fibers either directly or through the intermediate production of a core cane.

2. Technical Background

In the production of optical waveguide fibers, conventional chemical vapor deposition methods such as vapor axial deposition (VAD) and outside vapor deposition (OVD) use source compounds with high vapor pressures, such as chlorides of silicon($SiCl_4$) and germanium ($GeCl_4$). The source compounds are converted into vapor form using either bubblers or evaporators. The vapor is then transported into a flame and reacted with oxygen to form oxide soot particles. These particle are collected on a rotating starting rod or bait tube in the case of VAD or a rotating mandrel in the case of OVD. In some OVD systems, the cladding portion of the preform is deposited on a previously formed core preform or core cane, rather than on a mandrel.

In order for liquid or solution droplets to be converted into solid particles and then deposited on the target, the droplets must evaporate and combust with oxygen to form particles which are then captured on the target. The combustion, size and surface quality of the soot preform are dictated by the particle forming process and capture mechanisms.

Many of the high vapor pressure source compounds that contain elements which provide beneficial properties when incorporated into optical waveguide fibers are exceedingly difficult to make, are excessively expensive, and/or are difficult to handle. These drawbacks make it difficult if not impossible to effectively incorporate elements such as alkalis, alkaline-earths, and rare earths into the resultant optical waveguide fibers.

As an alternative to finding low vapor pressure compounds, and in order to generate sufficient vapor pressures from the compounds containing these beneficial elements, very high temperatures may be used within the burner. However, these elevated temperatures are not compatible with conventional vapor deposition equipment and the production of low loss fibers. An alternative way to deliver low vapor pressure compounds is to spray these compounds directly into the combustion zone in the form of liquid droplets. However, the spray often contains many large droplets that are not fully vaporized, resulting in large particle deposits on the target surface, due to their short resident time in the combustion zone.

Other problems are also associated with using these desired source compounds including the formation of large soot particles which create seed-warts, or imperfections, on the target surface. There are several mechanisms creating large soot particles (10 micrometers or larger) to form during droplet combustion. One mechanism is for non-vaporized large droplets to hit the target and continue to react on the target surface. Another source of large soot particles occurs when a droplet begins to evaporate, the vapor surrounding the droplet reacts with oxygen to form soot particles, and the remaining droplet serves as a nucleation center onto which the small particles aggregate, thereby forming a larger particle. Also, some solutions containing the desired compounds contain solid solutes involved in the reaction. When the solvent evaporates, solid solutes precipitate and decompose to form oxide particles. If the droplets containing the source solutes are large, the resultant oxide particles may also be large and serve as nucleation centers, thereby resulting in seed-warts being deposited on the target surface.

A solution is needed therefore which allows for depositing glass soot by forming liquid droplets of low vapor pressure compounds, increasing the resident time of the droplets in the combustion zone, and using the heat generated by combustion of fuel to vaporize these compounds.

SUMMARY OF THE INVENTION

One aspect of the present invention is to provide an apparatus for producing a glass soot that includes a first burner having a droplet-emitting first region, a gas-emitting second region surrounding the first region, and a gas-emitting third region surrounding the second region. The first region emits a glass forming mixture, the second region emits an inert gas, and the third region emits a combination of oxygen and a combustible gas. The apparatus further includes a conversion area having proximal and distal areas. The proximal area communicates with the first, second, and third regions. At least a portion of said glass-forming mixture is vaporized within the proximal area. The apparatus also includes at least two secondary burners each having gas-emitting fourth and fifth regions. The fourth regions of the secondary burners emit oxygen, and the fifth regions of the secondary burners emit a combustible gas. The distal area of the conversion area communicates with the fourth and fifth regions of the secondary burners. The glass-forming mixture is completely vaporized and converted to glass soot within the second section.

Another aspect of the invention is a method for increasing the resident time of low vapor pressure compounds in a combustion zone, including providing a first burner having a droplet-emitting first region, a coaxial gas-emitting second region surrounding the first region, and a coaxial gas-emitting third region surrounding the second region to define a conversion area having a proximate are and a distal area, wherein the proximate are is in communication with the first, second and third regions. The method also includes supplying a glass-forming mixture to the first region, an inert gas to the second region and a mixture of oxygen and a combustible gas to the third region, and vaporizing at least a portion of the glass-forming mixture by igniting the combustible gas within the proximate area of the conversion area. The method further includes positioning a second burner spaced from the first burner and having gas-emitting fourth and fifth regions, wherein the fourth and fifth regions are in communication with the distal area of the conversion area, supplying oxygen to the fourth region, and supplying a mixture of oxygen and a combustible gas to the fifth region. The method still further includes igniting the combustible gas within the conversion are for substantially completely vaporizing and converting the glass-forming mixture into glass soot, and forming a glass preform with the glass soot.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

For purposes of the description herein, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Figure 1:
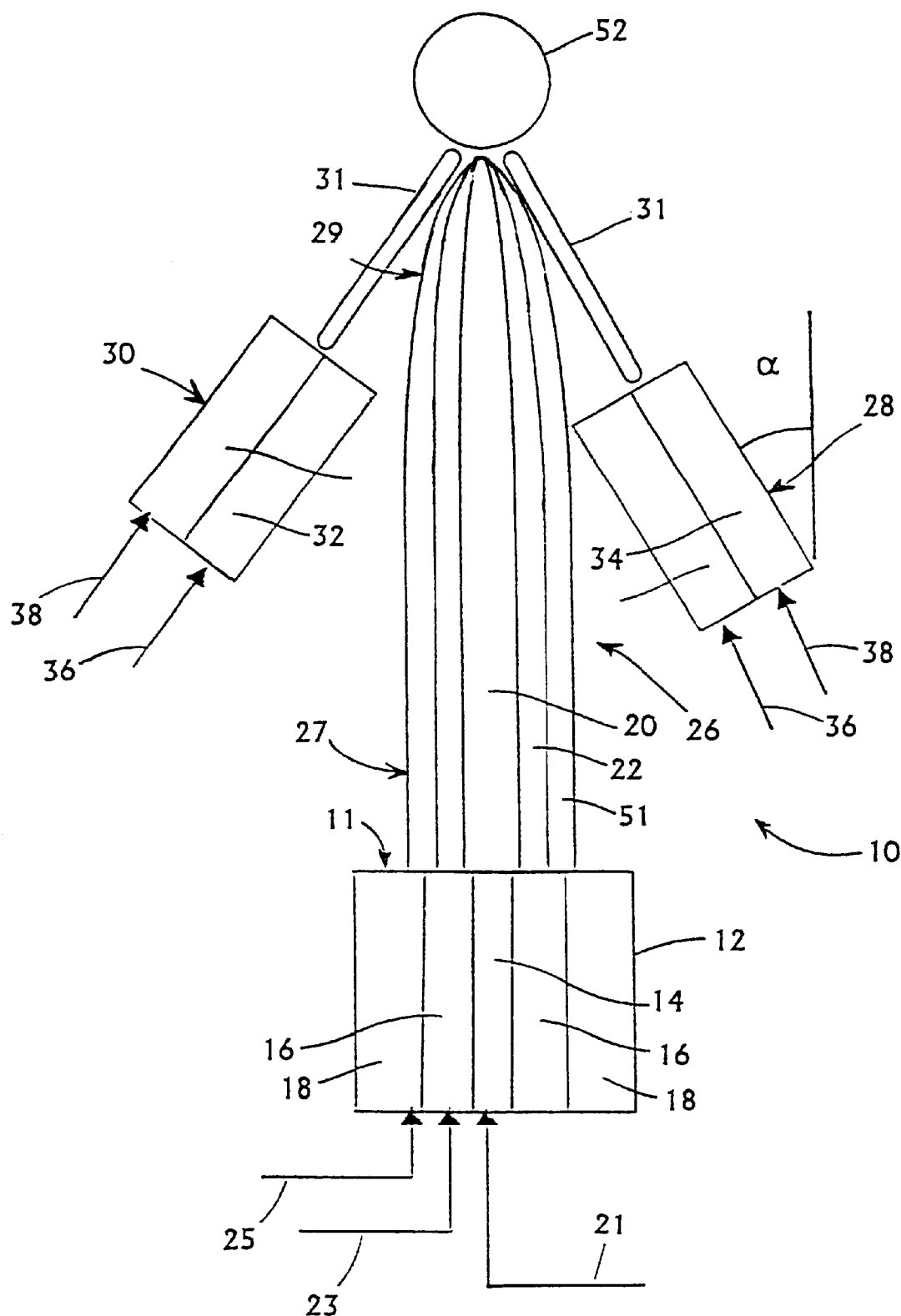
FIG. 1 is a schematic view of a burner system of the present invention.

Referring initially to FIG. 1, there is shown a combustion-enhanced atomization burner system 10 embodying the present invention and used to produce its method. Burner system 10 includes a first or primary burner 12 which has a droplet-emitting first region 14, a gas-emitting second region 16 surrounding first region 14, and a gas-emitting third region 18 surrounding second region 16. The first region 14 emits droplets of a glass-forming mixture 20 of a low vapor pressure compound from a source 21. The second region 16 emits an inert gas 22 such as nitrogen, helium or argon from a source 23, while the third region 18 emits a combination of oxygen and a combustible gas 24 such as methane from a source 25. Beyond the nozzle end 11 of burner system 10 is a conversion area 26 having a proximate area 27 located near burner 12 and a distal area 29 that is located away from burner 12. Proximate area 27 of conversion area 26 is in communication with the concentric first region 14, second region 16, and third region 18 of first burner 12.

Burner system 10 further includes a first secondary burner 28 and a second secondary burner 30 on opposite sides of the conversion area 26 near distal area 29. Each secondary burner 28 and 30 has a gas-emitting forth region 32 and a gas-emitting fifth region 34. Fourth regions 32 of secondary burners 28 and 30 each emit oxygen from a source 36, while fifth regions 34 of each secondary burner 28 and 30 emit a combustible gas such as methane from a source 38. Fourth region 32 and fifth region 34 of each secondary burner 28 and 30 are in communication with the distal area 29 of conversion area 26, within which the glass-forming mixture 20 is completely vaporized and converted into glass soot.

Figure 2:
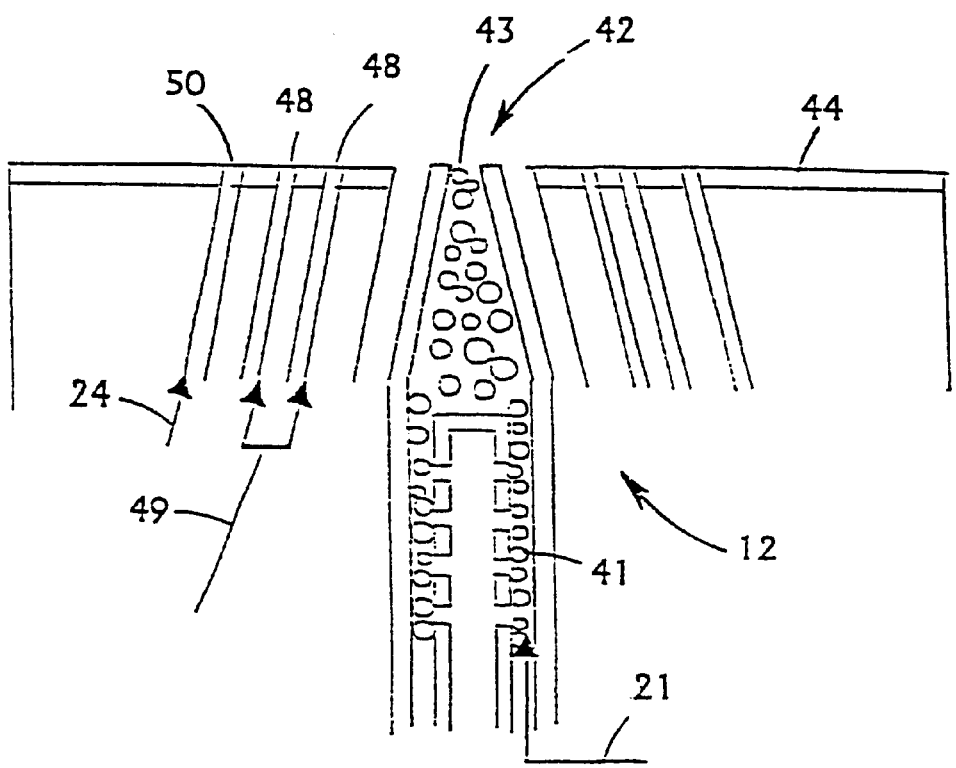
FIG. 2 is a schematic view of a primary burner.
Figure 3:
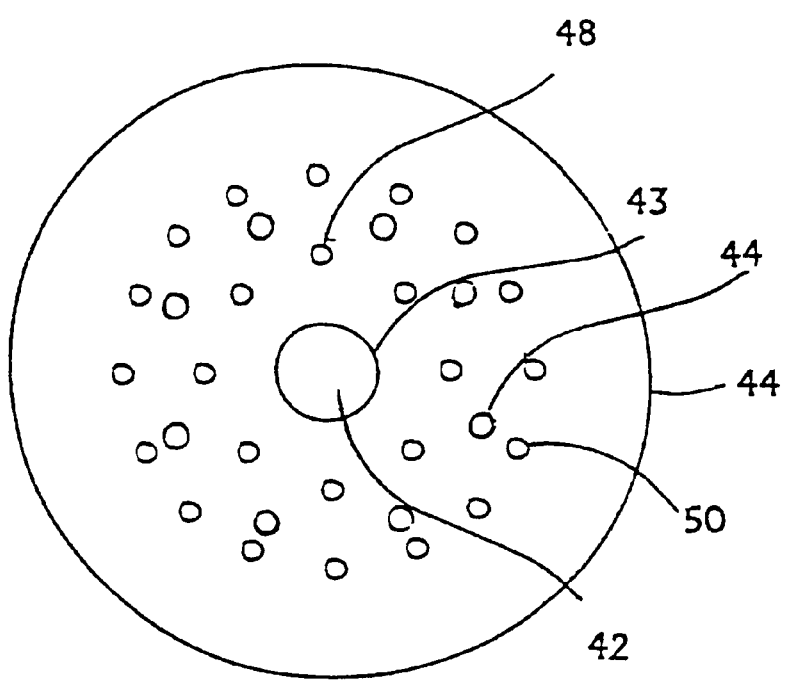
FIG. 3 is a schematic view of a face plate of the primary burner.
Figure 4:
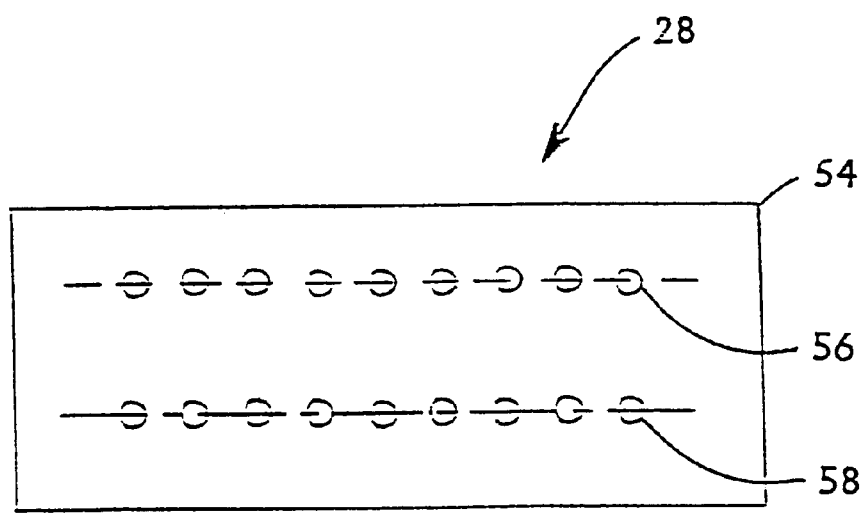
FIG. 4 is a schematic view of a face plate of a secondary burner.

As seen in FIG. 2, burner 10 is a precision atomizing burner similar to that disclosed in U.S. Pat. No. 5,599,371, which is incorporated herein by reference. First region 14 burner 10 is an atomizer 42 that delivers solution droplets 41 to a centrally located aperture 43 in a face plate 44 (FIG. 3) of the first burner 10 and into proximate area 27 of conversion area 26. The glass-forming mixture 20 (FIG. 1) is originally delivered to atomizer 42 in the form of a liquid from source 45. In the illustrated example, atomizer 42 is an ultrasonic nozzle operating at about 20 kHz. It should be noted, that ultrasonic nozzle 42 is used only as an example of a possible atomizer that could be used, and that any aerosol forming device could be substituted including pressurized atomizers, a two-fluid external atomizer, or any other atomizer that does not use oxygen as the atomizing gas.

Face plate 44 of burner 12 includes one or more inner rings of concentric apertures 48 that are used to emit the shield of inert gas 22 (FIG. 1) such as nitrogen, helium, or argon from source 23. The shield of inert gas 22 surrounds the droplets of source liquid 20 emitted from atomizer 42, and protects the droplets of source liquid 20 from reacting with oxygen and prematurely combusting, so that the resident time of the droplets of source liquid 20 within the conversion area 26 is increased, thereby allowing the droplets of the glass-forming mixture 20 to fully vaporize. In the illustrated example, two rings of apertures 48 were used to deliver a nitrogen gas 49 at a flow rate of about 20 SLPM (standard liters per minute), wherein standard temperature is 0° C., and standard pressure is one atmosphere. Face plate 44 further includes one or more outer rings of apertures 50 that are used to emit the premix fuel/oxygen 24 which is combusted to form a flame 51 that surrounds the inert gas 22 as emitted from face plate 44. In the present example, a fuel/oxygen mixture of $CH_4/O_2$ with a flow rate of about 10 SLPM of $CH_4$ and about 9.5 SLPM $O_2$ was combusted to form a methane-oxygen flame, however, any suitable fuel can be used. The premix methane-oxygen flame 51 located outside the stream of inert gas 22 within proximal area 27 enhances the vaporization of the droplets of the glass-forming mixture 20 by inhibiting combustion, as well as confining the vapor stream.

In the illustrated example, the distance between face plate 44 of burner 12 and bait rod 52 was between about 200 mm to about 275 mm. The glass-forming mixture 20 is inhibited from reacting with oxygen by the protective layer of inert gas 22, thereby increasing the resident time of the droplets within the conversion area 26 of elevated temperature. Secondary burners 28 and 30 are used to fully vaporize those remaining particles of the glass-forming mixture 20 within distal area 29 that did not fully vaporize in area 27 above the main burner as well as to provide the reactant necessary to allow combustion of the vapor from the glass-forming mixture 20 thus completing the conversion process, as discussed below. It should be noted that the particles of glass soot can be collected on a starting rod or bait tube in the case of VAD, or a rotation mandrel in the case of OVD. In some OVD systems, the cladding portion of the preform is deposited on a previously formed core preform or core cane, rather that on a mandrel. In the illustrated example, a bait rod having a diameter of about 8.1 mm was used.

Secondary burners 28 and 30 are ribbon burners similar in construction and operation, therefore the description of first secondary burner 28 is also descriptive of second secondary burner 30. First secondary burner 28 (FIG. 4) includes a face plate 54 which has a first row of spaced aligned apertures 56 that emit and project oxygen gas 36 towards the center of the distal conversion area 29, thereby providing oxidant to the vapor/droplet stream of glass-forming mixture 20. Face plate 54 of first secondary burner 28 also has a second row of spaced aligned apertures that emit and project a premix fuel/oxygen 38 similar to the premix fuel/oxygen 24 as described above in relation to primary burner 12. In the present example, the premix fuel/oxygen was applied at a flow rate of about 5 SLPM of $CH_4$ and 9.5 SLPM of $O_2$. The premix fuel/oxygen 38 when ignited provides a flame 31 that provides additional heat for the vaporization and reaction of the glass-forming mixture 20. Secondary burners 28 and 30 provide the additional energy desirable for the complete vaporization of the remaining droplets of the glass-forming mixture 20, as well as the oxygen necessary for the complete reaction and combustion of the vapor from the glass-forming mixture 20 to glass soot deposited on bait rod 52. In the present example, the extra oxygen supply rate was about 20 SLPM.

Adjustments are provided within burner system 10 that allow adjustment of the resident time of the drops of glass-forming mixture 20 within conversion area 26. The distance between first burner 12 and bait rod 52 is adjustable within a range of about 200 mm to about 275 mm, thus allowing the operator to adjust the relative resident time that the droplets of the glass-forming mixture 20 remains in the elevated temperature of proximal area 27 of conversion area 26 as created by flame 51, before coming into contact with the extra oxygen as emitted by secondary burners 28 and 30 and located within distal area 29 of conversion area 26, as well as before contacting the target bait rod 52.

The distance between secondary burner 28 and 30 and bait rod 52 are also adjustable between a range of about 112 mm and about 190 mm, thus allowing the operator to adjust the amount of heat being supplied at the point of contact between the soot particles and the target bait rod 52. Further, first and second secondary burners 28 and 30 and rotatably adjustable. More specifically, angles α are defined between the direction of the flow of the gas emitted from primary burner 12 and secondary burners 28 and 30. First and second secondary burners 28 and 30 are adjustable such that angles α can be altered, thus allowing the operator to adjust the relative resident time that the droplets of the glass-forming mixture 20 remain in the elevated temperature of the conversion area 26 before coming into contact with the oxygen reactant. This adjustment also allows adjustment of the shape of the reactant stream of oxygen, thereby allowing the operator to adjust the intercept angle between the two streams and not unduly effect the overall direction of the stream of soot particles as they contact target bait rod 52. In the illustrated example, the angles α are adjustable between about 30° to about 45°, however, other angles may be used.

Figure 5:
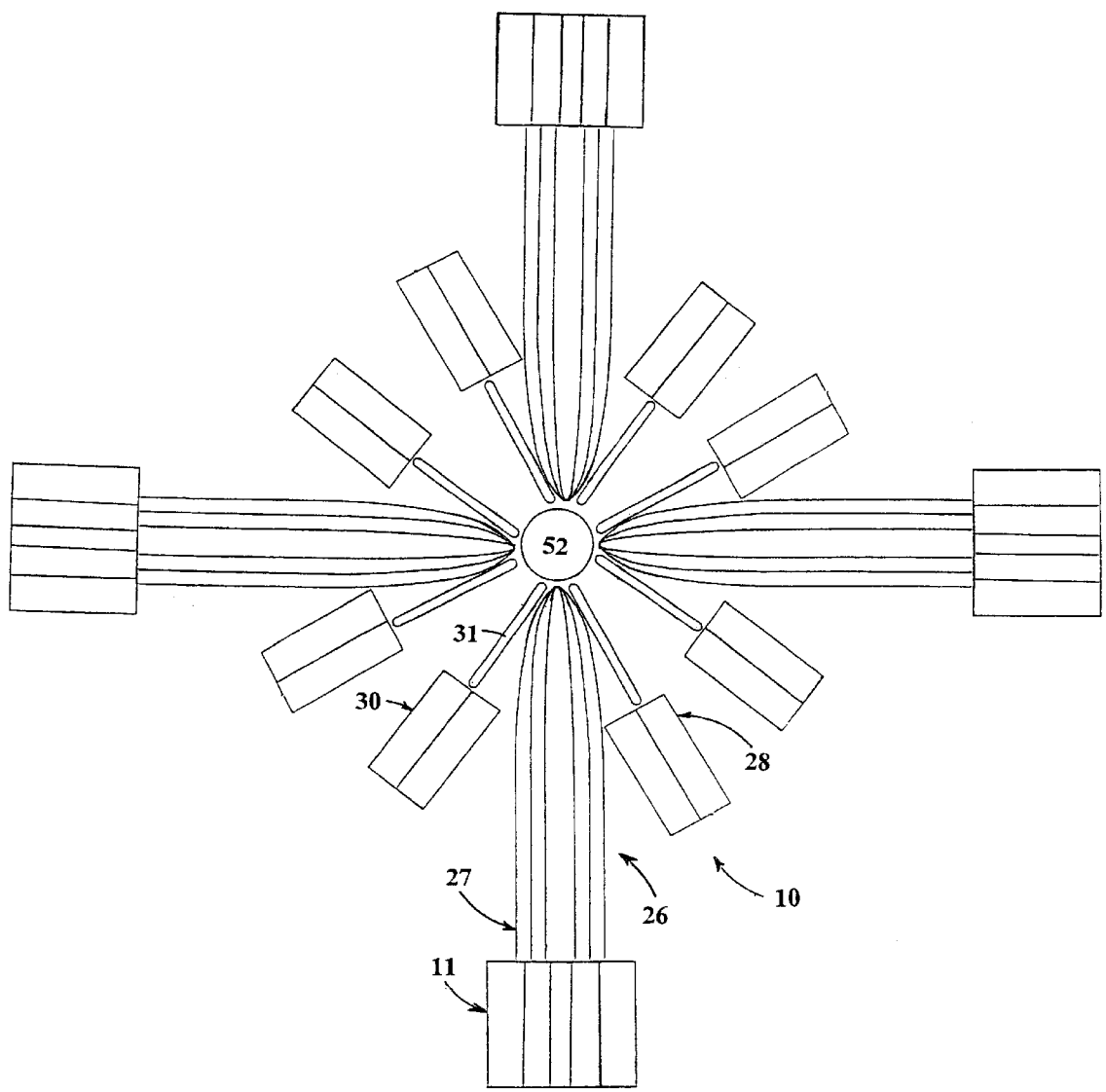
FIG. 5 is a schematic view of the burner system having a plurality of primary and secondary burners.

More preferably, burner system 10 (FIG. 5) includes a plurality of primary burners 12 and secondary burners 28 and 30 equidistantly and concentrically spaced about the subject bait rod 52. As illustrated, burner system 10 includes four primary burners 12 and four secondary burners 28 and 30, however, it should be noted that any number of primary burners 12 and secondary burners 28 and 30 may be employed.

An advantage of the multiple burner system spaced equidistantly and concentrically about the bait rod 52. As illustrated, burner system 10 includes four primary burners 12 and dour secondary burners 28 and 30, however, it should be noted that any number of primary burners 12 and secondary burners 28 and 30 may be employed.

An advantage of the multiple burner system spaced equidistantly and concentrically about the bait rod 52, is a more symmetric soot stream resulting in a more even distribution and depositing of soot onto the bait rod 52, thereby resulting in a more symmetric resultant glass preform as compared to a single burner system located on a single side of the bait rod 52. As noted above, any number of burners may be employed. The greater the number of burners employed to deposit the soot onto bait rod 52, the closer the approximation to a round tube and the more evenly the soot is deposited.

The present inventive combustion-enhanced atomization burner system 10 then facilitates depositing of glass soot by forming liquid droplets of low vapor pressure compounds by increasing the resident time of the droplets in the conversion zone, and using secondary burners to vaporize these compounds. Burner system 10 makes it possible to use low vapor pressure compounds in conjunction with convention vapor deposition methods and equipment.

It will become apparent to those skilled in the art that various modifications to the preferred embodiment of the invention as described herein can be made without departing from the spirit or scope of the invention as defined by the appended claims.

The invention claimed is:

1. An apparatus for producing a glass soot used in the formation of an optical fiber, comprising:
   a first burner having a droplet-emitting first region, a gas-emitting second region surrounding said first region, and a gas-emitting third region surrounding said second region, said first region emitting a glass-forming mixture, said second region emitting an inert gas, and said third region emitting a combination of oxygen and a combustible gas;
   a conversion area having a proximal and a distal area, said proximal area in communication with said first, second, and third regions, wherein at least a portion of said glass-forming mixture is converted into glass soot within said proximal area; and
   at least one secondary burners having gas-emitting fourth and fifth regions, said fourth region of said secondary burner emitting oxygen and said fifth region of said secondary burner emitting a combustible gas, said fourth and fifth regions of said secondary burner in communication with said distal area of said conversion area, to add heat for the complete conversion of said glass-forming mixture into glass soot.

2. The apparatus of claim 1, wherein the distance between said first burner and said glass preform is adjustable.

3. The apparatus of claim 2, including first and second secondary burners.

4. The apparatus of claim 3, wherein said first secondary burner is rotatably adjustable such that a first angle between the gas emitted from said primary burner and the gas emitted from said first secondary burner is adjustable.

5. The apparatus of claim 4, wherein said second secondary burner is rotatably adjustable such that a second angle between the gas emitted from said primary burner and the gas emitted from said second secondary burner is adjustable.

6. The apparatus of claim 5, wherein said glass forming mixture includes low vapor pressure compounds.

7. The apparatus of claim 6, wherein said glass forming mixture comprises octamethylcyclotetrasiloxane.

8. The apparatus of claim 7, including a plurality of first burners and a plurality of second burners forming substantially concentric circles.

9. The apparatus of claim 1, wherein said glass forming mixture of said first region includes at least one element from a group of elements consisting of alkali metals, alkaline-earth metals and rare-earth metals.

10. The apparatus of claim 1, wherein said inert gas includes providing at least one gas selected from a group consisting of nitrogen, helium, and argon.

11. The apparatus of claim 1, wherein said first burner includes an atomizer in communication with said first region.

12. The apparatus of claim 11, wherein said atomizer includes an ultrasonic nozzle.

13. The apparatus of claim 12, wherein said ultrasonic nozzle is activated at a frequency of about 20 kHz.

14. The apparatus of claim 1, including a plurality of first burners and a plurality of second burners forming substantially concentric circles.

15. An apparatus for producing a glass soot, comprising:
a primary burner having a first region for emitting droplets of a glass forming mixture, a second region for emitting an inert gas that surrounds said droplets, and a third region for emitting a gas which is a mixture of oxygen and a first combustible gas,
a conversion area having a first section and a second section, said first section in communication with said first, second, and third regions, and wherein at least a portion of said glass-forming mixture is converted into a glass soot within said first section; and,
at least one secondary burner having a fourth region for emitting oxygen, and a fifth region for emitting a second combustible gas, said fourth and fifth regions being in communication with said second section of said conversion area, and wherein with added heat from said secondary burner said glass-forming mixture is completely converted into a glass soot within said second section of said conversion area.

16. The apparatus of claim 15, wherein said secondary burner is adjustably mounted with respect to said primary burner such that a first angle between the gas emitted from said primary burner and the gas emitted from said first secondary burner is adjustable.

17. The apparatus of claim 16, and further including an additional secondary burner having a fourth region for emitting oxygen and a fifth region for emitting a second combustible gas, said fourth and fifth regions in communication with said second section of said conversion area.

18. The apparatus of claim 17, wherein said secondary burner and additional secondary burners are ribbon burners.

19. The apparatus of claim 15, wherein said glass forming mixture includes at least one element from a group of elements group consisting of alkali metals, alkaline-earth metals and rare-earth metals.

20. The apparatus of claim 16, wherein said glass forming mixture is octamethylcyclotetrasiloxane.

21. The apparatus of claim 15, wherein said inert gas includes at least one gas from a group consisting of nitrogen, helium, and argon.

22. The apparatus of claim 15, wherein the glass soot is deposited on a bait rod.

23. The apparatus of claim 22, wherein a distance between said primary burner and said bait rod is adjustable.

24. The apparatus of claim 15, including a plurality of first burners and a plurality of second burners forming substantially concentric circles about said bait rod.

25. A method for forming a glass preform, comprising the steps of:
providing a first burner having a droplet-emitting first region, a coaxial gas-emitting second region surrounding the first region, and a coaxial gas-emitting third region surrounding the second region to define a conversion area having a proximate area and a distal area wherein the proximate area is in communication with the first, second and third regions;
supplying a glass-forming mixture to the first region;
supplying an inert gas to the second region;
supplying a mixture of oxygen and a combustible gas to the third region;
vaporizing at least a portion of the glass-forming mixture into glass soot by igniting the combustible gas within the proximate area of the conversion area;
positioning a second burner spaced from the first burner and having gas-emitting fourth and fifth regions wherein the fourth and fifth regions are in communication with the distal area of the conversion area;
supplying oxygen to the fourth region;
supplying a mixture of oxygen and a combustible gas to the fifth region;
igniting the combustible gas within the conversion area for substantially completely vaporizing and converting the glass-forming mixture into glass soot; and
forming a glass preform with the glass soot.

26. The method of claim 25, and further including:
positioning a third burner that includes fourth and fifth gas-emitting regions each in communication with the distal area of the conversion area, and that is spaced apart from the first and second burners.

27. The method of claim 26, and further including:
adjusting the distance between the first burner and the glass preform.

28. The method of claim 27, and further including:
adjusting the angle at which the gases emitted from the second burner mix with the gases emitted from the first burner.

29. The method of claim 28, and further including:
adjusting the angle at which the gases emitted from the third burner mix with the gases emitted from the first and second burners.

30. The method of claim 25, and further including:
providing a plurality of first burners and a plurality of second burners in substantially concentric circles.

* * * * *